(12) United States Patent
Tena Han et al.

(10) Patent No.: US 10,793,081 B2
(45) Date of Patent: Oct. 6, 2020

(54) DEPLOYABLE ELECTRONIC DEVICE HOLDER

(71) Applicant: Ford Global Technologies, LLC, Dearborn, MI (US)

(72) Inventors: Luis Adrian Tena Han, Tlalnepantla de Baz (MX); Carmen Frida Vargas Garcia, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/176,358

(22) Filed: Oct. 31, 2018

(65) Prior Publication Data

US 2020/0130602 A1   Apr. 30, 2020

(51) Int. Cl.
*B60R 11/02* (2006.01)
*B60R 11/00* (2006.01)
*F16M 13/02* (2006.01)

(52) U.S. Cl.
CPC ........... *B60R 11/02* (2013.01); *B60R 11/0205* (2013.01); *B60R 11/0241* (2013.01); *B60R 11/0252* (2013.01); *B60R 11/0258* (2013.01); *B60R 2011/0007* (2013.01); *B60R 2011/0043* (2013.01); *B60R 2011/0082* (2013.01); *B60R 2011/0084* (2013.01); *B60R 2011/0085* (2013.01); *F16M 13/022* (2013.01); *F16M 2200/022* (2013.01); *F16M 2200/025* (2013.01)

(58) Field of Classification Search
CPC ... B60R 7/08; B60R 11/02; B60R 2011/0007; B60R 2011/0082; B60N 3/002
USPC ............ 248/685, 27.1, 27.3, 220.22, 222.11, 248/222.13, 223.41, 224.61; 206/557; 108/44; 296/37.12
See application file for complete search history.

(56) References Cited

U.S. PATENT DOCUMENTS

| | | | | |
|---|---|---|---|---|
| 4,417,764 A | * | 11/1983 | Marcus | B60N 2/793 297/188.17 |
| 4,792,174 A | * | 12/1988 | Shioda | B60N 3/002 108/45 |
| 5,996,866 A | | 12/1999 | Susko et al. | |
| 6,244,647 B1 | * | 6/2001 | Allison | B60R 7/06 296/37.1 |
| 6,929,131 B1 | * | 8/2005 | Landi | A47F 5/0846 211/87.01 |
| 8,091,709 B2 | * | 1/2012 | Gnepper | B65D 11/12 206/37 |
| 9,302,629 B1 | | 4/2016 | Hall et al. | |
| 9,783,124 B2 | | 10/2017 | Catlin et al. | |
| 9,902,339 B2 | | 2/2018 | Gilling et al. | |
| 2003/0174463 A1 | * | 9/2003 | Chen | B60R 11/02 361/679.26 |
| 2005/0056734 A1 | * | 3/2005 | Lee | B60R 11/0235 248/27.3 |

(Continued)

*Primary Examiner* — Terrell L McKinnon
*Assistant Examiner* — Michael McDuffie
(74) *Attorney, Agent, or Firm* — David Coppiellie; Price Heneveld LLP

(57) ABSTRACT

A deployable electronic device holder is provided that includes sliding mechanism disposed within a slot in a panel in a vehicle, and a base pivotally coupled to the sliding mechanism and having a cradle configured to support a device. The sliding mechanism slides within the slot and the base pivots about at least one hinge downward to a use position to hold a portable electronic device.

16 Claims, 4 Drawing Sheets

(56) References Cited

U.S. PATENT DOCUMENTS

| | | | |
|---|---|---|---|
| 2009/0085366 A1* | 4/2009 | Doom | B60R 7/06 |
| | | | 296/37.12 |
| 2012/0006235 A1* | 1/2012 | Rigner | B60N 3/002 |
| | | | 108/38 |
| 2012/0049558 A1* | 3/2012 | Souillac | B60R 11/00 |
| | | | 296/37.12 |
| 2012/0097725 A1* | 4/2012 | Lee | B60R 11/02 |
| | | | 224/567 |
| 2015/0048217 A1* | 2/2015 | Prin | B60K 37/04 |
| | | | 248/27.1 |
| 2015/0343963 A1* | 12/2015 | Angeletti | B60R 11/0241 |
| | | | 296/37.12 |
| 2015/0367784 A1* | 12/2015 | Bergerioux | B60R 7/04 |
| | | | 296/37.8 |
| 2017/0217381 A1* | 8/2017 | Gilling | B60R 11/02 |
| 2018/0186301 A1* | 7/2018 | Vander Sluis | B60R 11/02 |
| 2019/0143869 A1* | 5/2019 | Sequi | B60N 3/002 |
| | | | 296/152 |

* cited by examiner

DEPLOYABLE ELECTRONIC DEVICE HOLDER

FIELD OF THE INVENTION

The present invention generally relates to electronic device holders, and more particularly relates to a deployable device holder for holding one or more portable electronic devices, particularly for use in a vehicle.

BACKGROUND OF THE INVENTION

Automotive vehicles are commonly equipped with various storage bins and cup holders that are frequently used to hold electronic devices, such as smartphones, tablets and other portable electronic devices. Vehicle operators and passengers increasingly use such portable electronic devices in vehicles for navigation, music, phone and electronic communication and other uses. The storage of such electronic devices within the storage bins or the cup holders in the vehicle generally can be inconvenient. It would be desirable to provide for an enhanced electronic device holder onboard a vehicle that can be easily deployed to hold one or more portable electronic devices.

SUMMARY OF THE INVENTION

According to one aspect of the present invention, a deployable electronic device holder is provided. The deployable electronic device holder includes a sliding mechanism disposed within a slot, and a base pivotally coupled to the sliding mechanism and having a cradle configured to support a device, wherein the sliding mechanism slides within the slot and the base pivots relative to the sliding mechanism to a use position.

Embodiments of the first aspect of the invention can include any one or a combination of the following features:
 at least one hinge connecting the sliding mechanism to the base;
 the at least one hinge comprises one or more friction hinges configured to position the base at a selected angle relative to the sliding mechanism;
 the base pivots downward to the use position;
 the sliding mechanism comprises a sliding member disposed within a track within the slot;
 a release mechanism for retaining the sliding mechanism within the slot in a stowed position and for releasing the sliding mechanism to slide such that the base can extend outward from the slot to pivot to the use position;
 the release mechanism comprises a push to release and push to retain mechanism;
 the release mechanism comprises a spring and a follower;
 the device holder is located on a vehicle; and
 the slot is located in one of a front console panel and rear console panel of the vehicle.

According to another aspect of the present invention, a deployable electronic device holder is provided. The deployable electronic device holder includes a sliding mechanism disposed within a slot in a panel in a vehicle, and a base pivotally coupled to the sliding mechanism and having a cradle configured to support a device, wherein the sliding mechanism slides within the slot and the base pivots downward to a use position.

Embodiments of the second aspect of the invention can include any one or a combination of the following features:
 at least one hinge connecting the sliding mechanism to the base;
 the at least one hinge comprises one or more friction hinges configured to position the base at a selected angle relative to the sliding mechanism;
 an opening provided in the base and configured to receive a cable for connecting to the device;
 the sliding mechanism comprises a sliding member disposed within a track within the slot;
 a release mechanism for retaining the sliding mechanism within the slot in a stowed position and for releasing the sliding mechanism to slide such that the base can extend outward from the slot to pivot to the use position;
 the release mechanism comprises a push to release and push to retain mechanism;
 the release mechanism comprises a spring and a follower;
 the panel is one of a front console panel and a rear console panel; and
 the slot is located in a center stack of the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
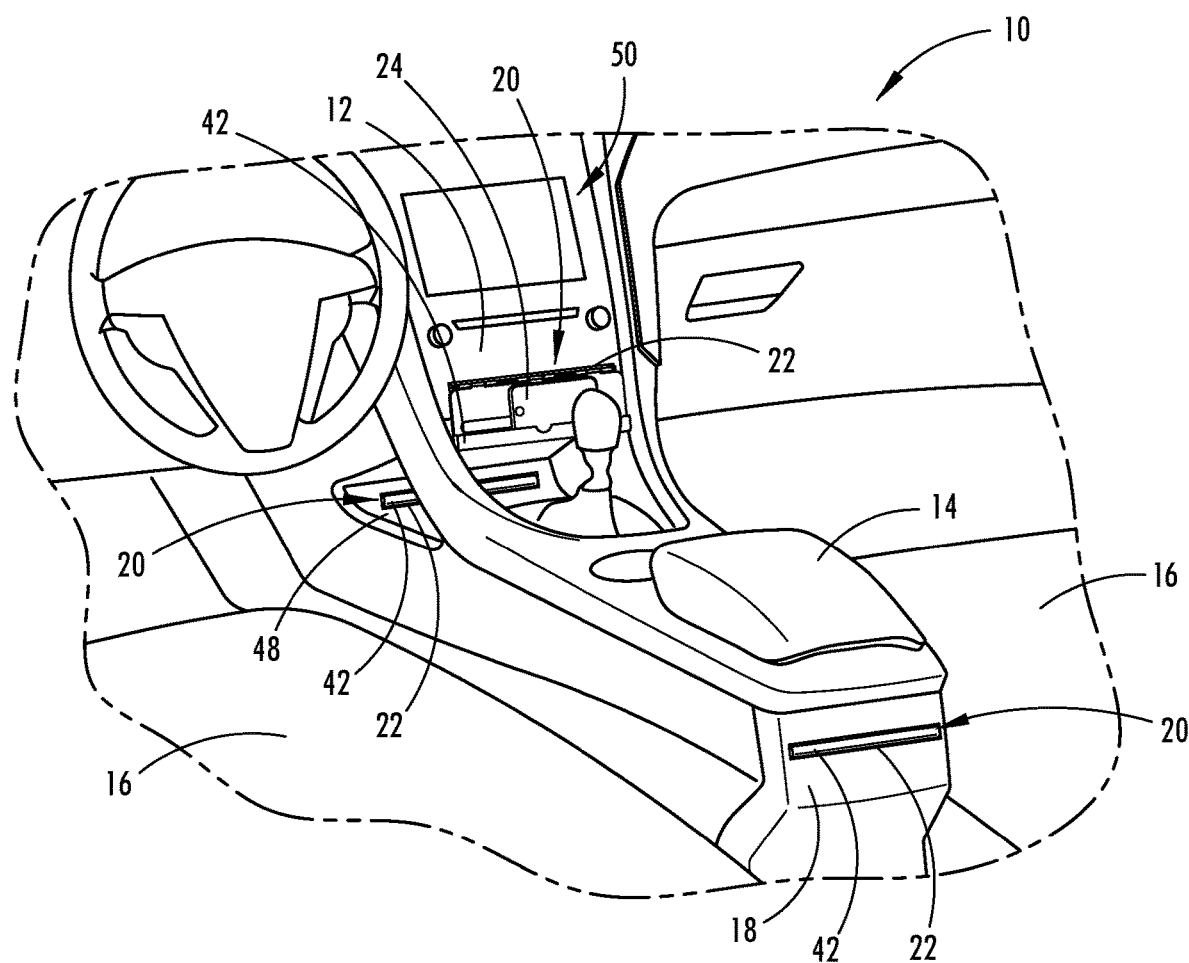
FIG. 1 is a perspective view of the interior of a motor vehicle having deployable electronic device holders illustrated in front and rear console panels, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

Referring now to FIG. 1, the interior of a vehicle 10 is generally illustrated defining a passenger compartment and having deployable electronic device holders 20 for holding one or more portable electronic devices 24 when the device holder 20 is configured in the fully deployed use position. The vehicle 10 may be a wheeled motor vehicle such as a car, truck, sport utility vehicle (SUV), van, bus or other vehicle. For example, the vehicle 10 may include a boat, a train, an aircraft or other vehicles that may be well-suited to include an electronic device holder for holding one or more portable electronic devices. The portable electronic devices 24 that may be held on the device holder 20 may include, but are not limited to, a phone such as a smart phone, a tablet, a computer, a navigation device, a radio, and other portable electronic devices.

The vehicle 10 is generally shown having an interior passenger compartment shown equipped with seats 16, such as a driver seat and a front side passenger seat arranged side-by-side to provide a front row of seats and separated by a center console 14. The center console 14 may include a storage bin with a top cover that may be used as an armrest and has a rear console panel 18 that may be positioned generally forward of a rearward row of passenger seats. In addition, the vehicle 10 has a front console panel 12 which may be configured as a center stack 50 and a front media bin 48 with vehicle installed electronics and other media. A first slot 22 is shown formed in the front console panel 12 in the center stack 50 for receiving a first deployable electronic device holder 20. A second slot 22 is shown formed in the front console panel 12 in the media bin 48 for receiving a second deployable electronic device holder 20. A third slot 22 is also formed in the rear console panel 18 for receiving a third deployable electronic device holder 20. Each of the slots 22 is an elongated and generally horizontal slot that substantially fully receives the deployable electronic device holder 20 when the device holder 20 is in the stowed position and allows components of the deployable electronic device holder 20 to slide outward and pivot to a deployed use position.

One or more deployable electronic device holder 20 may be located in various locations on the vehicle 10. For example, a deployable electronic device holder 20 may be located elsewhere in the first console panel 12, in the rear console panel 18, or at other locations within the vehicle 10 and may be deployed to allow for the holding of one or more electronic devices for passengers seated in the first or front row of seating, the second or rear row of seating or at other seating locations onboard the vehicle 10. A first or rear row seated passenger may easily deploy and stow the device holder 20 as needed. The device holder 20 may be located at any other location on the vehicle 10.

Figure 2:
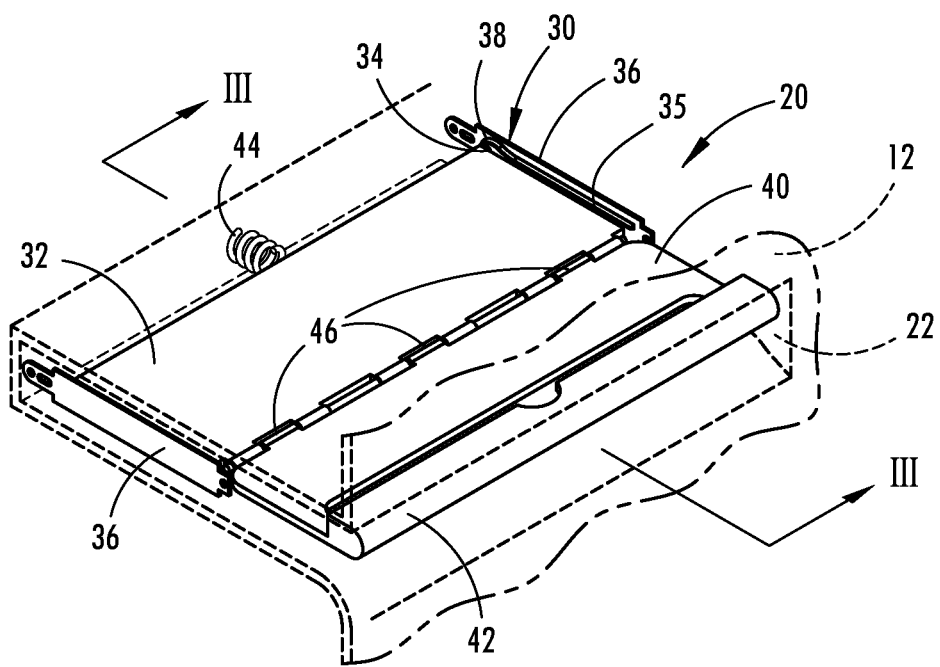
FIG. 2 is an enlarged view of the deployable electronic device holder illustrated in FIG. 1 shown in a stowed position.
Figure 3:
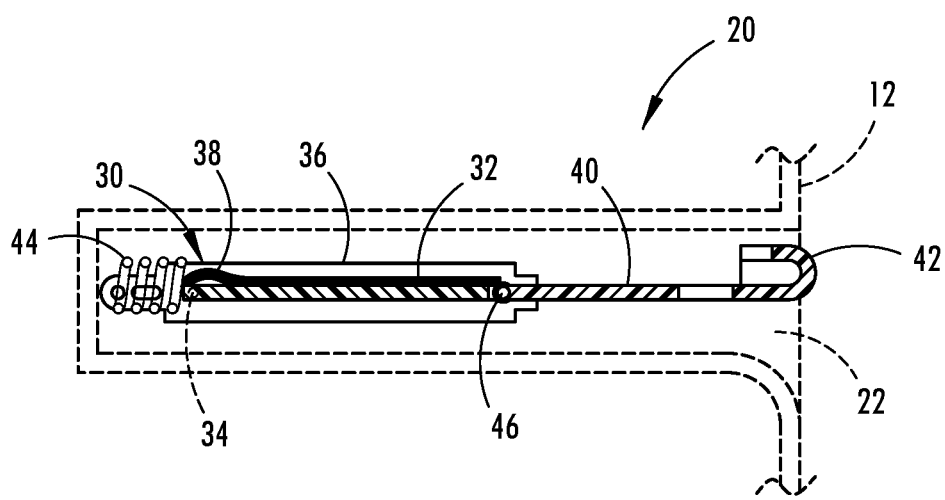
FIG. 3 is a cross-sectional view taken through line of FIG. 2 further illustrating the deployable electronic device holder in the stowed position.

The deployable electronic device holder 20 is shown in more detail in FIGS. 2-7. In FIGS. 2 and 3, the deployable electronic device holder 20 is shown in a stowed position substantially fully stowed within the slot 22 in the front center console 12. Portions of the front center console 12 have been removed for clarity. The deployable electronic device holder 20 has a sliding mechanism 30 disposed within the slot 22 to allow the device holder 20 to slide between the stowed position stored in the slot 22 and the deployed use position extending outward from the slot 22. The sliding mechanism 30 includes a sliding member shown as a sliding panel 32 having track engagement members shown as pins 34 located on opposite lateral sides. The pins 34 extend laterally outward and engage a slot 35 within a track 36 on opposite lateral sides of the sliding panel 32. One or more pins 34 may engage a single track on one side only of the sliding panel 32, according to another embodiment. The slot 35 within the track 36 extends along a longitudinal axis to allow the sliding panel 32 to slide forward to a deployed use position and rearward to the fully stowed position. The sliding panel 32 is pivotally connected to a base 40 via at least one hinge 46. The at least one hinge 46 thereby connects the sliding panel 32 to the base 40 and allows the base 40 to pivot relative to the sliding panel 32 between a horizontal position as shown in FIG. 2 and a fully deployed position with the base 40 pivoted and hanging downward. The at least one hinge 46 may include three friction hinges as shown, according to one exemplary embodiment. The three friction hinges 46 are configured to position and hold the base 40 at a user selected angle relative to the sliding panel 32. The friction hinges 46 provide frictional pivoting engagement at various articulating positions to maintain the base 40 and an electronic device 24 held thereon in a user selectable position during normal vehicle driving conditions.

The deployable electronic device holder 20 further includes a spring 44 positioned at the rear end of the sliding panel 32 for biasing the sliding panel 32 towards a forward position. The track 36 includes a follower 38 which engages the pins 34 within slot 35 and when biased by the spring 44 forms a push-to-release and push-to-retain locking mechanism for holding the deployable electronic device holder 20 in the stowed position and actuatable to release the device holder 20 to enable a user to move the device holder to the deployed use position.

The deployable electronic device holder 20 is further configured to have a cradle 42 formed at the forward end of the base 40. The cradle 42 is formed at a forward end by an upstanding wall forming a device receiving slot for receiving an electronic device, particularly when the base 40 is oriented in a vertical or downward angled position. The cradle 42 may form a rectangular-shaped slot or a U-shaped slot, according to various embodiments. The cradle 42 may be configured and sized depending upon the width, length and shape of the portable electronic device to be held thereon.

Figure 4:
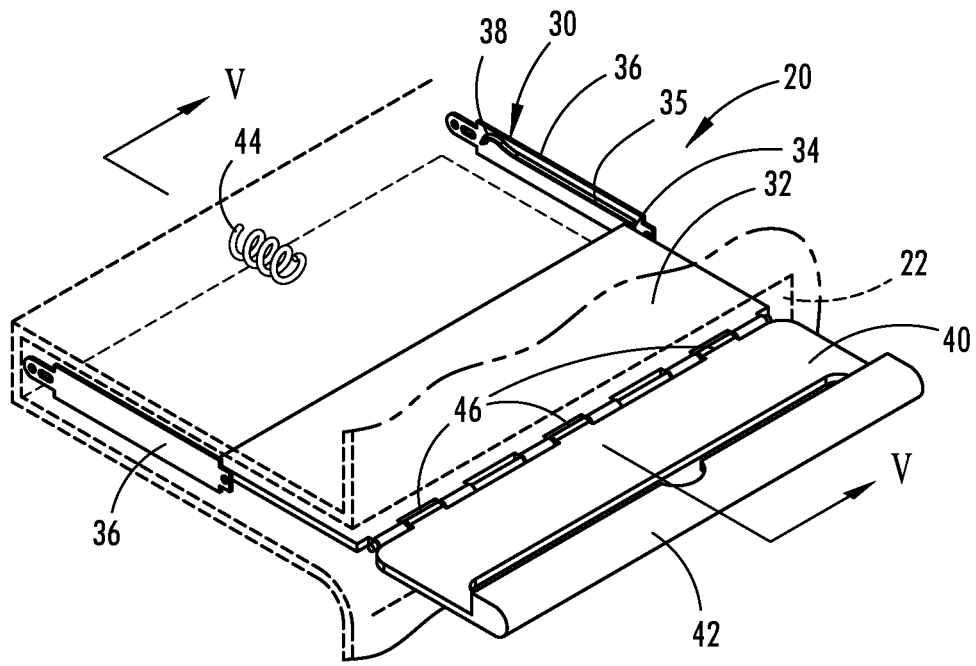
FIG. 4 is an enlarged perspective view of the deployable electronic device holder shown in a partially extended position.
Figure 5:
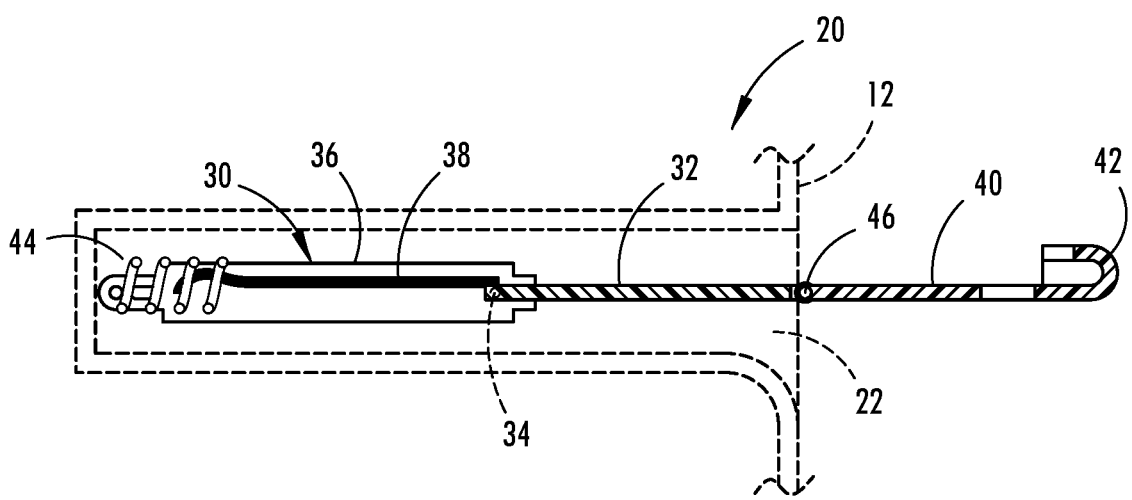
FIG. 5 is a cross-sectional view taken through line V-V of FIG. 4 further illustrating the deployable electronic device holder in the partially extended position.

In order to deploy the device holder 20, a user may apply a force by pushing inward on the end of the cradle 42 to release the deployable electronic device holder 20 from its stored position by way of the push-to-release formed by the spring 44 and follower 38 engaging the pins 34. Once released, the deployable electronic device holder 20 may be biased forward by the spring 44 to a position advanced towards the deployed use position and may be pulled by a user further forward with a force to extend the device holder 20 further towards the deployed use position. Referring to FIGS. 4 and 5, the deployable electronic device holder 20 is shown in a partially deployed state in which the sliding panel 32 and base 40 are shown slid horizontally forward such that the base 40 extends completely forward of the end of the slot 22 in panel 12. In this position, the base 40 is free to pivot downward to a fully deployed use position.

Figure 6:
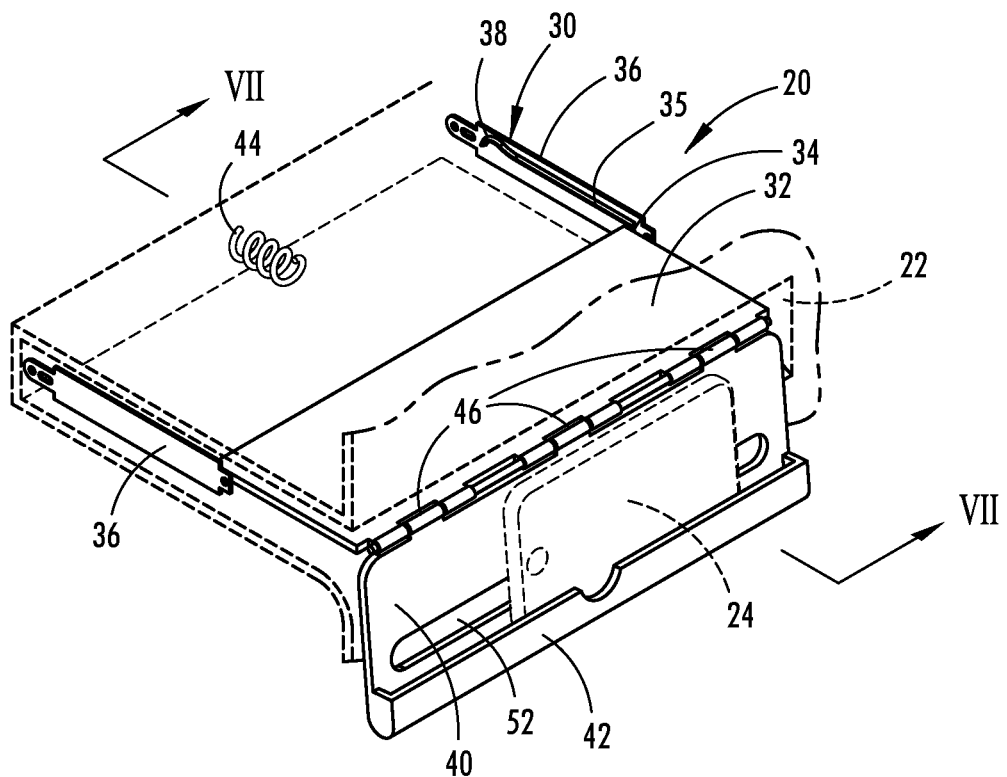
FIG. 6 is an enlarged perspective view of the deployable electronic device holder shown in a fully deployed use position and holding an electronic device.
Figure 7:
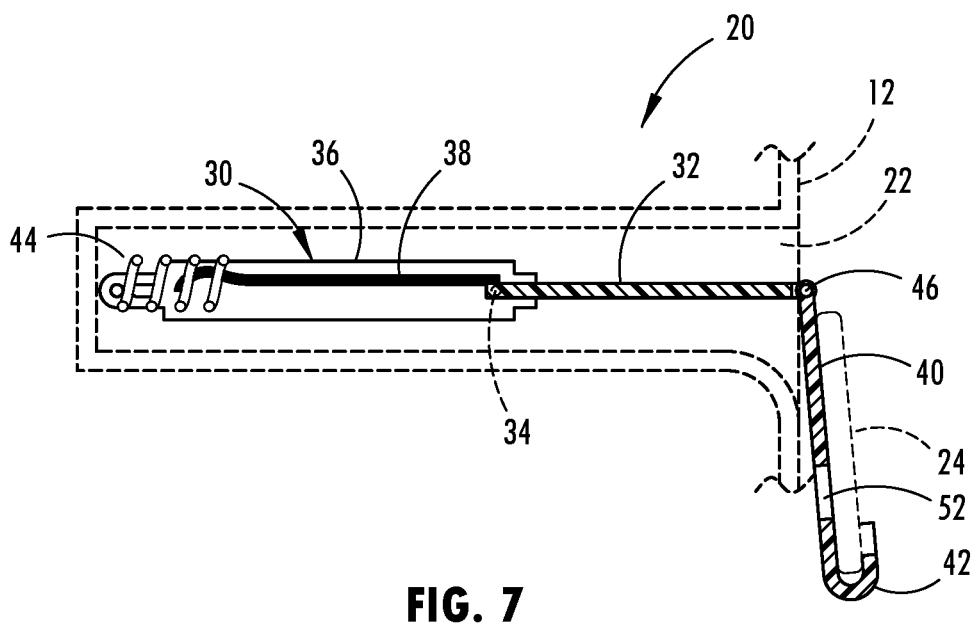
FIG. 7 is a cross-sectional view taken through line VII-VII of FIG. 6 further illustrating the deployable electronic device holder in the fully deployed use position.

Referring to FIGS. 6 and 7, the deployable electronic device holder 20 is further illustrated in the fully deployed position in which the sliding panel 32 and base 40 are slid to the forward position and the base 40 is further pivoted downward about the at least one hinge 46 to a deployed use position that is able to hold one or more electronic devices 24. In the fully deployed use position, the base 40 and its cradle 42 are angled downward sufficiently such that the cradle is capable of receiving a portable electronic device 24 and holding the portable electronic device 24 in a fixed position due to gravity and during normal vehicle driving conditions. The base 40 and its cradle 42 may be oriented downward at an angle of forty-five to ninety degrees (45-90°) relative to the sliding panel 32, according to one embodiment. It should be appreciated that other shapes, sizes and orientation angles of the cradle 42 and base 40 may be employed.

The base 40 is further shown having an opening 52 extending therethrough in the shape of a slot. The opening 52 is configured to allow one or more cables such as USB connectors or other power and/or data communication cables to extend therethrough and connect to one or more electronic devices held on the device holder 20. The opening 52 may have any shape or size that allows one or more cables to pass therethrough.

In order to move the deployable electronic device holder 20 from the fully deployed position shown in FIGS. 6 and 7 to the stowed position shown in FIGS. 2 and 3, a user may pivot the base 40 upwards to a horizontal position and push inward on the base 40 or its cradle 42 to slide the sliding panel 32 and base 40 rearward in the slot 22 until the panel 32 compresses the spring 44 and the pins 34 engage the follower 38 to engage a locked stowed position due to a push-to-retain mechanism provided by such components. In the fully stowed position, the sliding panel 32 and base 40 are substantially fully stowed within the slot 22 and therefore are substantially hidden from view and out of the way when not in use.

Accordingly, the deployable electronic device holder 20 advantageously provides for a stowable device holder that may be stowed and hidden within a panel of the vehicle 10 and may be easily deployed to a use position to provide an easy to use device holder for holding one or more portable electronic devices 24.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A deployable electronic device holder comprising:
   a sliding mechanism disposed within a slot, the sliding mechanism comprising track engagement members engaging a track within the slot; and
   a base pivotally coupled to the sliding mechanism via at least one hinge at a first end of the base and having a cradle configured to support a device at a forward end of the base opposite the first end, wherein the sliding mechanism slides within the slot and the base pivots relative to the sliding mechanism to a use position in which the cradle is wholly downward of the sliding mechanism, and wherein the sliding mechanism further slides within the slot to a stowed position retained by a locking mechanism.

2. The device holder of claim 1, wherein the at least one hinge comprises one or more friction hinges configured to position the base at a selected angle relative to the sliding mechanism.

3. The device holder of claim 1, wherein the base pivots downward to the use position.

4. The device holder of claim 1, wherein the locking mechanism comprises a release mechanism for releasing the sliding mechanism to slide such that the base can extend outward from the slot to pivot to the use position.

5. The device holder of claim 4, wherein the locking mechanism comprises a push to release and push to retain mechanism.

6. The device holder of claim 5, wherein the locking mechanism comprises a spring and a follower.

7. The device holder of claim 1, wherein the device holder is located on a vehicle.

8. The device holder of claim 7, wherein the slot is located in one of a front console panel and rear console panel of the vehicle.

9. A deployable electronic device holder comprising:
   a sliding mechanism disposed within a slot in a panel in a vehicle, the sliding mechanism comprising track engagement members engaging a track with the slot; and
   a base pivotally coupled to the sliding mechanism and having a cradle formed at a forward end of the base and configured to support a device, wherein the sliding mechanism slides within the slot and the base pivots downward to a use position about at least one hinge disposed at an end of the base opposite the forward end, and wherein the sliding mechanism further slides within the slot to a stowed position retained by a locking mechanism.

10. The device holder of claim 9, wherein the at least one hinge comprises one or more friction hinges configured to position the base at a selected angle relative to the sliding mechanism.

11. The device holder of claim 9 further comprising an opening provided in the base and configured to receive a cable for connecting to the device.

12. The device holder of claim 9, wherein the locking mechanism comprises a release mechanism for releasing the sliding mechanism to slide such that the base can extend outward from the slot to pivot to the use position.

13. The device holder of claim 12, wherein the locking mechanism comprises a push to release and push to retain mechanism.

14. The device holder of claim 13, wherein the locking mechanism comprises a spring and a follower.

15. The device holder of claim 9, wherein the panel is one of a front console panel and a rear console panel.

16. The device holder of claim 15, wherein the slot is located in a center stack of the vehicle.

* * * * *